May 26, 1925.                D. J. RITCHIE                1,539,696
                                 LAMP
                          Filed June 16, 1921
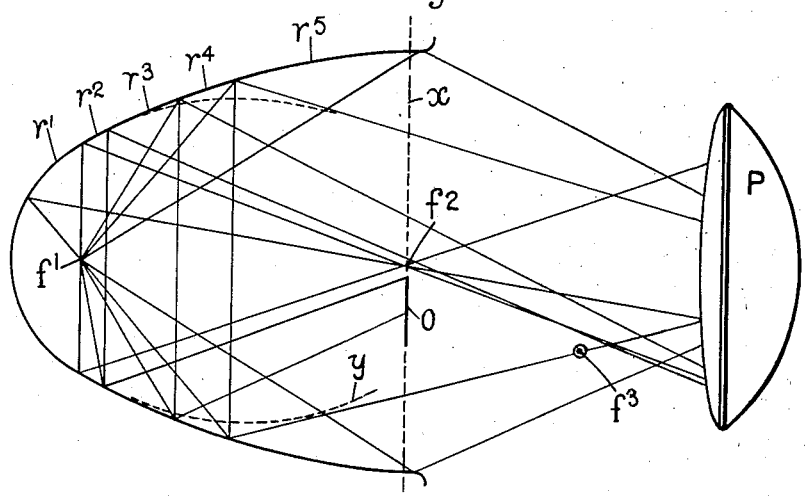
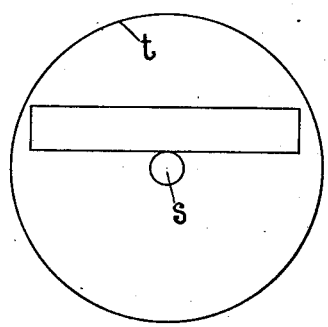
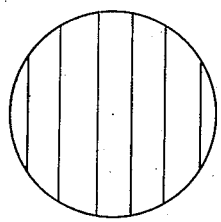
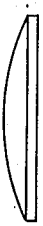
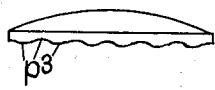
INVENTOR
D. J. Ritchie
By [signature]
Atty.

Patented May 26, 1925.

1,539,696

UNITED STATES PATENT OFFICE.

DUNCAN JAMES RITCHIE, OF LONDON, ENGLAND.

LAMP.

Application filed June 16, 1921. Serial No. 478,089.

*To all whom it may concern:*

Be it known that I, DUNCAN JAMES RITCHIE, a British subject, residing at 24 Cavendish Drive, London, E. 1, England, have invented certain new and useful Improvements in Lamps, of which the following is a specification.

This invention relates to head lamps for automobiles of the kind in which light from a source of small dimension is collected by a reflector and is directed to a focusing lens or objective in such a way as to produce a beam of light for illuminating the path of the automobile.

Where an ellipsoidal reflector has been used, a beam of light of maximum range and hence minimum divergence has been obtained by the combination with the ellipsoidal reflector of a source of light of one focus thereof and a convex projecting lens or objective having its principal focus located at or near the second focus of the reflector. In this class of apparatus the light emitted from the source is collected by the reflector and converges to the second focus of the said reflector after which it diverges until it passes through the lens, from which it emerges as a beam of great intensity and small divergence. In such apparatus, it is possible to collect 60 to 70% of the light emitted in all directions from the source and to form, by means of this light, a small intensely bright spot at the other focus of the ellipsoidal reflector, the rays of light concentrated on this second focus to form a bright spot then pass through the lens.

With ellipsoidal reflectors having successive zones a spot of light is materially larger in all directions with its intensity correspondingly reduced; while if the forward part of the reflector is shaped to converge some of the reflected rays of light to points in front of the second focus, the bright spot in the focal plane is surrounded by an area of varying light intensity which contains a number of bright and dark rings ordinarily due to commercial irregularities of the reflector. Where an obturator has been arranged at or near the focal plane of the lens so that the beam of light has a well defined upper limit, the beam is defined in vertical planes, but in order that the light may render the most effective service for automobile lighting, it is necessary to spread the beam out laterally without at the same time increasing the depth.

The present invention is directed therefore to means for spreading the light laterally without increasing the depth of the beam while avoiding streaks, patches, and generally uneven illumination, thus diminishing light intensity laterally without a corresponding variation of intensity vertically.

The invention is illustrated in the accompanying drawings, in which:

Fig. 1 is a diagrammatic view illustrating the improved lamp, the reflector being of ellipsoidal form near the axis but departing therefrom towards the edge in a series of successive zones.

Fig. 2 is a view of the image projected by the lamp shown in Fig. 1.

Figs. 3 and 4 are views in rear and side elevation of the lens.

Figs. 5 and 6 are edge views of slightly different forms of lens.

The reflector of the present invention is shown as including a central area $r^1$ adjoining the axis of the reflector, which area is ellipsoidal, the reflector beyond this area departing from the ellipsoidal form by curving outwardly therefrom in a series of successive zones $r^2$, $r^3$, $r^4$, $r^5$, which remain in a continuous curve with the ellipsoidal form. The light source is situated at the focus $f^1$ of the ellipsoidal area of the reflector. A lens P is provided having its focal point at substantially the second focal point $f^2$ of the ellipsoidal area $r^1$ of the reflector. An obturator $o$, comprising a substantially rectangular strip of material, is supported from the lamp casing across the beam of light at substantially the point of second focus $f^2$.

The zone $r^2$ of the reflector is a surface of revolution generated by part of an ellipse with its foci at $f^1$, $f^3$, and the zone $r^4$ is conical. The zone $r^3$ is a curve maintaining continuity between the adjoining zones. In this construction, the small amount of light directed between the zone $r^5$ and the edges of the projecting lens is neglected. The construction gives a bright central beam with a surrounding region of rapidly decreasing intensity, projecting an image of the illuminated plane $x$.

The obturator need not be as wide as the aperture, provided that the bright central part of the beam, corresponding to the position of the eyes of other possible road users, is obturated, and the depth of the obturator may be small so as to give some top light. In all cases, it is preferably silvered on its rear face. Fig. 2 shows a diagrammatic view of a general form of an image produced by the lamp illustrated in Fig. 1. In this figure, *s* indicates a central bright spot, and *t* a surrounding region of lesser illumination. In connection with automobile head lamps, it is desirable to extend both parts of the image laterally, and this is accomplished by modifying the projector lens P with a series of vertical corrugations of any suitable form. With this construction, there is lateral projection or width without increased depth. By forming these vertical corrugations of slightly different shape in section, some variation in lateral spread may be obtained. Such different forms are illustrated in Figs. 3 to 6 inclusive.

While describing the invention as applied to motor head lamps, it is obvious that it may be applied to locomotive head lights, lights for ships or light houses, or for other purposes, where a proper definition of the beam is desirable.

I claim:

1. In a head lamp, a reflector having a rear ellipsoidal portion and successive zones curving outwardly therefrom in a continuous curve, a source of light at one focus of such ellipsoidal portion, a projecting lens with vertical corrugations with the second focus of the rear portion substantially in the principal focal plane of the lens, and an obturator with an operative edge positioned transversely of the reflector in the focal plane of the lens, whereby the light collected by the reflector and directed through the lens forms a beam with a well defined upper limit, and a lateral spread at right angles to the corrugations of the lens greater than its spread in a direction parallel to such corrugations.

2. In head lamps of the character described, an ellipsoidal reflector having successive zones curving outwardly therefrom in a continuous curve, a source of light arranged at one focus of the reflector, a projecting lens having a number of parallel vertical grooves or corrugations positioned so that its principal focal plane is substantially at the second focus of the reflector, and a rectangular bar or obturator having an operative edge positioned transversely of the reflector and in the focal plane of the lens perpendicular to the grooves of the lens and adjacent to the second focus of the reflector, whereby to encroach slightly upon the bright spot.

3. In head lamps of the character described, an ellipsoidal reflector, a source of light arranged at one focus of said reflector, a projecting lens having a number of parallel vertical grooves or corrugations, the lens being positioned so that its principal focal plane is substantially at the second focus of the ellipsoid, and a bar or obturator with an operative edge arranged in the focal plane of the lens perpendicular to the grooves of the lens and adjacent to the second focus of the ellipsoid so as to encroach slightly upon the bright spot, the bar or obturator being of such limited downward extent as to permit light to pass from the reflector to the lens under said obturator.

In testimony whereof I affix my signature.

DUNCAN JAMES RITCHIE.